(12) United States Patent
Akoum et al.

(10) Patent No.: US 10,673,685 B2
(45) Date of Patent: Jun. 2, 2020

(54) FACILITATING BEAM RECOVERY REQUEST FOR 5G OR OTHER NEXT GENERATION NETWORK

(71) Applicant: AT&T Intellectual Property I, L.P., Atlanta, GA (US)

(72) Inventors: Salam Akoum, Austin, TX (US); Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 141 days.

(21) Appl. No.: 15/681,131

(22) Filed: Aug. 18, 2017

(65) Prior Publication Data
US 2019/0058629 A1  Feb. 21, 2019

(51) Int. Cl.
| | | |
|---|---|---|
| *H04W 72/04* | (2009.01) | |
| *H04L 12/24* | (2006.01) | |
| *H04L 1/16* | (2006.01) | |
| *H04B 7/08* | (2006.01) | |
| *H04B 7/06* | (2006.01) | |
| *H04L 5/00* | (2006.01) | |
| *H04W 56/00* | (2009.01) | |
| *H04W 74/08* | (2009.01) | |

(52) U.S. Cl.
CPC ....... *H04L 41/0668* (2013.01); *H04B 7/0695* (2013.01); *H04B 7/088* (2013.01); *H04L 1/16* (2013.01); *H04L 5/0048* (2013.01); *H04W 56/001* (2013.01); *H04W 72/046* (2013.01); *H04W 72/0413* (2013.01); *H04W 74/0833* (2013.01)

(58) Field of Classification Search
CPC ........... H04W 56/001; H04W 72/0413; H04W 72/046; H04W 74/0833; H04L 41/0668; H04L 5/0048
See application file for complete search history.

(56) References Cited

U.S. PATENT DOCUMENTS

| 8,060,039 B2 | 11/2011 | Gibbs |
| 8,682,283 B2 | 3/2014 | Kodali et al. |
| (Continued) | | |

FOREIGN PATENT DOCUMENTS

| EP | 2771999 A2 | 9/2014 |
| WO | 2016019515 A1 | 2/2016 |
| (Continued) | | |

OTHER PUBLICATIONS

US 9,591,571 B2, 03/2017, Xu et al. (withdrawn)
(Continued)

*Primary Examiner* — Lan-Huong Truong
(74) *Attorney, Agent, or Firm* — Amin, Turocy & Watson, LLP

(57) ABSTRACT

When configured, a channel state information reference signal (CSI-RS) can be used to identify new beams. If CSI-RS based monitoring fails to identify new beams, and no other reference signals (RS) are used for beam management, the user equipment cannot identify a new beam. However, instead of using a 4-step random access channel (RACH) procedure for beam recovery request transmission, a modified 2-step contention-based RACH procedure can saves overhead and reduce latency associated with the 4-step procedure.

20 Claims, 15 Drawing Sheets

(56) References Cited

U.S. PATENT DOCUMENTS

| | | | |
|---|---|---|---|
| 9,144,045 B2 | 9/2015 | Koorapaty et al. | |
| 9,407,409 B2 | 8/2016 | Bhattad et al. | |
| 9,419,759 B2 | 8/2016 | Choi et al. | |
| 9,560,592 B2 | 1/2017 | Xu et al. | |
| 9,668,253 B2 | 5/2017 | Lee et al. | |
| 2014/0376466 A1* | 12/2014 | Jeong | H04W 74/0833 370/329 |
| 2016/0056935 A1 | 2/2016 | Damnjanovic et al. | |
| 2016/0353510 A1* | 12/2016 | Zhang | H04L 43/16 |
| 2017/0331670 A1 | 11/2017 | Parkvall et al. | |
| 2017/0346545 A1 | 11/2017 | Islam et al. | |
| 2018/0367374 A1* | 12/2018 | Liu | H04W 16/28 |
| 2019/0037423 A1* | 1/2019 | Yu | H04W 24/04 |
| 2019/0053313 A1* | 2/2019 | Zhou | H04W 76/18 |
| 2019/0053314 A1* | 2/2019 | Zhou | H04B 7/0695 |

FOREIGN PATENT DOCUMENTS

| | | |
|---|---|---|
| WO | 2017024516 A1 | 2/2017 |
| WO | 2017078785 A1 | 5/2017 |
| WO | 2017151187 A1 | 9/2017 |
| WO | 2017151876 A1 | 9/2017 |
| WO | 2017178697 A1 | 10/2017 |
| WO | 2017196612 A1 | 11/2017 |

OTHER PUBLICATIONS

US 9,655,045 B2, 05/2017, Xu et al. (withdrawn)

NPL-VIVO, "Beam recovery based on NR-PDCCH and NR-PDSCH", 3GPP TSG RAN WG1 Meeting #89, R1-1707245, May 15-19, 2017, pp. 1-4 (Year: 2017).*

NG, "5G NR mmWave Standards, Recent updates: NR bands & beam management," Jul. 2017, Samsung Electronics, 10 pages. http://mmwrcn.ece.wisc.edu/wp-uploads/2017/05/5G-NR-Boon-Samsung-Keynote.pdf.

Sur et al., "BeamSpy: Enabling Robust 60 GHz Links Under Blockage," Proceedings of the 13th USENIX Symposium on Networked Systems Design and Implementation (NSDI '16), Mar. 2016, pp. 193-206, USENIX Association, 15 pages. https://pdfs.semanticscholar.org/1a9b/3d24c2999ccbdf7a0a84840b1d55975a69f3.pdf.

International Search Report and Written Opinion dated Oct. 24, 2018, for International Application No. PCT/US2018/045503.

Ericsson. Mechanism to recover from beam failure. 3GPP Draft; R1-1711017 Mechanism to recover from beam failure, 20170626 3rd Generation Partnership Project (3GPP), Mobile Competence Centre ; 650, route des Lucioles ; F-06921 Sophia-Antipolis Cedex ; France.

Samsung. NR L1/L2 beam recovery procedure. 3GPP Draft; R2-1707305 NR L1 L2 beam recovery procedure, 20170626 3rd Generation Partnership Project (3GPP), Mobile Competence Centre ; 650, route des Lucioles ; F-06921 Sophia-Antipolis Cedex ; France.

Xinwei. Discussion on Beam Failure Recovery. 3GPP Draft; R1-1712268 Discussion on Beam Failure Recovery_v2, 20170809 3rd Generation Partnership Project (3GPP), Mobile Competence Centre ; 650, route des Lucioles ; F-06921 Sophia-Antipolis Cedex ; France.

International Preliminary report on patentability received for PCT Application Serial No. PCT/US2018/045503 dated Feb. 27, 2020, 10 pages.

* cited by examiner

# FACILITATING BEAM RECOVERY REQUEST FOR 5G OR OTHER NEXT GENERATION NETWORK

TECHNICAL FIELD

This disclosure relates generally to facilitating failure recovery of a beam. For example, this disclosure relates to facilitating signaling and channels for a beam identification and recovery request transmission for a 5G or other next generation network.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating signaling and channels for new beam identification and recovery request transmission is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
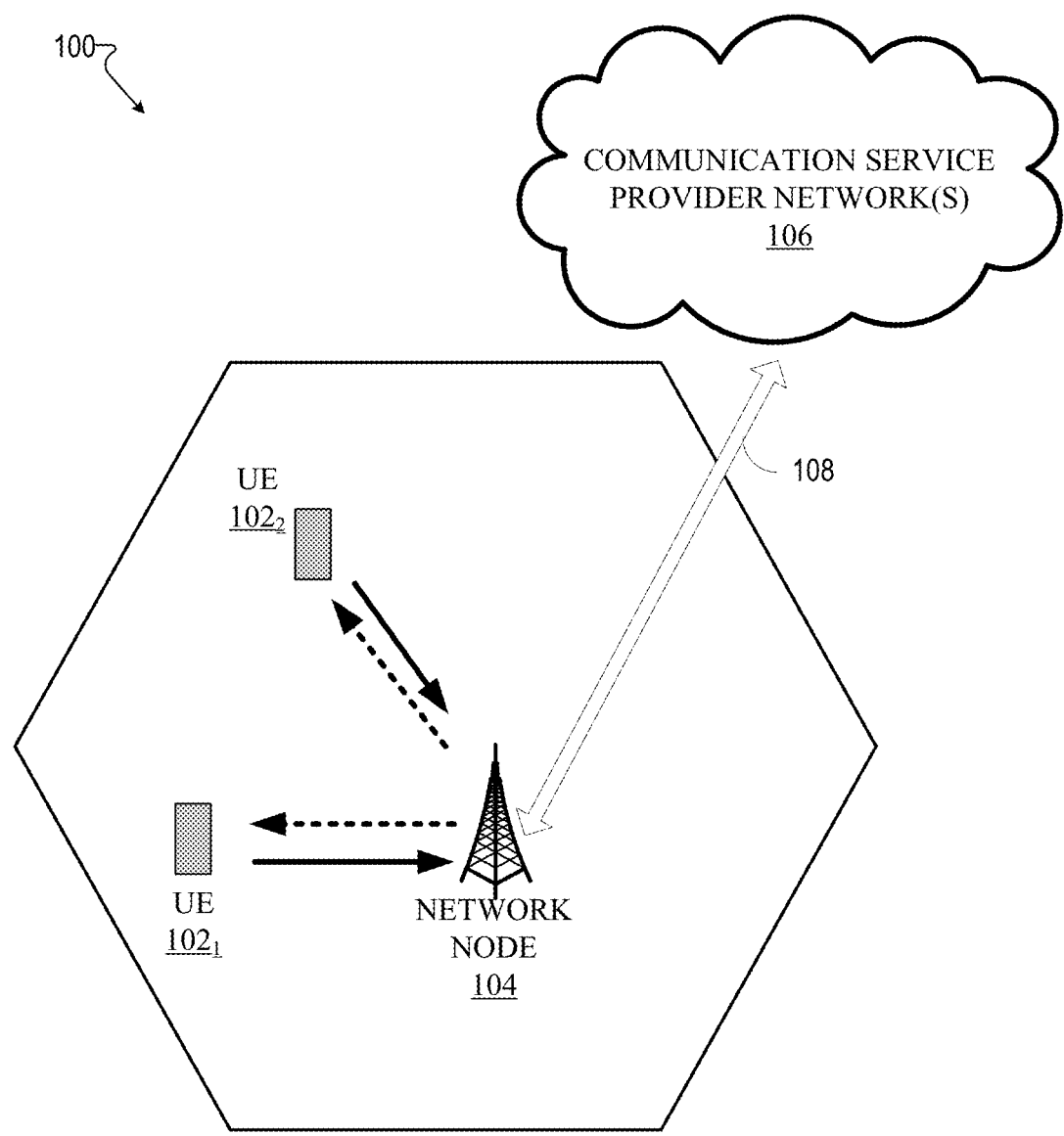
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate beam recovery for a 5G or other next generation network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate beam recovery for a 5G network. Facilitating beam recovery for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time—frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels.

The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

Beam recovery procedure is clear for a single beam pair link (BPL), where a beam pair link is a pair of a DL Tx beam and an UL Rx beam. The BPL quality can be estimated by the associated RS resource. Therefore the failure of the RS resource represents the beam failure. However, a UE can be configured with multiple sets of BPLs. Each set of BPL(s) can associated with one RS resource.

After beam failure detection, the UE can try to identify a new candidate beam to be used for beam recovery. To identify a new candidate beam, the UE can monitor the beam identification RS. This RS can be CSI-RS, used for beam management, if it is configured by the network. In the case when CSI-RS is not configured, or when the configured set of CSI-RS cannot be used to identify a new beam, another RS can be used to do new beam identification.

After new beam identification, the UE can send a beam recovery request transmission. Information carried by the beam recovery request transmission can include, but is not limited to, information about identifying UE and new network node (e.g., gNB) TX beam information. The channels that carry the beam recovery request transmissions can be similar to a non-contention physical random access channel (PRACH) based on PRACH, which uses resources orthogonal to resources of other PRACH transmissions.

In addition to non-contention based PRACH, other channels for recovery request transmissions can also potentially be used, such as contention-based RACH resources. A straightforward way is to use the 4-step RACH procedure, similar to the one used in initial access, is with preambles chosen from the traditional RACH resource pool.

During a beam failure recovery procedure, after beam failure detection, the UE can monitor the beam identification reference signal (RS), to identify new beams for recovery. A beam failure can be detected when the UE is not able to receive any signal data detecting that the beam is working. Beam identification RS s can be UE-specific channel state information-reference signal (CSI-RS), used for beam management, if configured for the UE. When configured, the CSI-RS can be used to identify new beams. If the CSI-RS based monitoring fails to identify a new beam, and no other RS is used for beam management, the UE cannot identify the new beam in the current example. This can result in either a recovery signaling to the network to inform the network of no new candidate beam exists, or a declaration of beam failure.

However, use of a synchronization signaling (SS) block, as another RS used for new beam identification, can be implemented in a 2-step approach for new beam identification. Existing solutions for beam recovery request transmission can use non-contention based random access channel (RACH) type resources to inform the network of the identified new beam and the occurrence of the beam failure. These resources might not be sufficient when another RS, other than the configured CSI-RS is used for new beam identification, such as SS-block. Instead of using the traditional 4-step RACH procedure for beam recovery request transmission, this disclosure discusses a modified 2-step contention-based RACH procedure that preserves overhead and reduces latency associated with the traditional 4-step procedure.

RACH resources can comprise preambles (e.g., unique UE identifiers) that are already configured to a specific UE. The preambles can allow the system to operate as a non contention-based system, wherein the UE can send the network device a preamble to assist in identification of the UE, thereby preserving resources. However, in a non-contention-based system, the number of reserved preamble resources might be small compared to non-reserved preamble resources used in contention-based RACH procedure. Therefore non-contention based resources might not be sufficient to transmit new beam identifiers based on another reference signal, such as SS-block This disclosure proposes signaling procedures for the new beam identification in the beam recovery procedure. Using this new beam identification approach, can comprise using new channels for recovery request transmission from the UE to the network.

A two-step procedure can be used, wherein the first step comprises using configured CSI-RS resources to identify a new beam, and where the second step comprises using SS-block transmitted RS to identify the new beam. In NR initial access, synchronization signals (e.g., a primary synchronization signal (PSS), a secondary synchronization signal (SSS) and/or a primary broadcast channel (PBCH)) can be transmitted within an SS-block. One or multiple SS-blocks compose an SS burst. One or multiple SS bursts compose an SS burst set where the number of SS bursts within an SS burst set is finite. A given number of SS blocks per cell can be transmitted with a given periodicity, depending on the carrier frequency, to establish synchronization of the UE with a network device of the network. SS-blocks are not configured per UE, but rather transmitted periodically by the network.

In one embodiment, during the two-step beam identification procedure, based on configured CSI-RS resources in step 1, a new beam can be identified, and identification data associated with the new beam can be reported in a recovery request transmission. In another scenario where the configured CSI-RS fails to identify a new beam, a second step, can comprise utilization of SS-blocks to identify the new beam. SS-block based new candidate beam identification can then be signaled to the network via the recovery request transmission. Additionally, for the case where the CSI-RS is not configured in the network, the SS-block based new candidate beam identification can then be signaled to the network via the recovery request transmission.

In another embodiment, use of a channel associated with the recovery request transmission, can prompt a modified contention-based RACH procedure to report on the new identified beam in the 2-step approach be used in the aforementioned embodiment. For example, when configured CSI-RS resources are used for new beam identification, non-contention channel based on physical (P)RACH can be used for beam recovery request transmissions. The required overhead to report on identified beams using configured CSI-RS is not significant enough to merit the use contention-based RACH preamble resources. For the two-step new beam identification procedure, when the SS-block is used to identify new beams, the number of the SS-blocks transmitted for a given cell identification (ID) can lead to a large overhead that cannot be handled by reserving contention-free preamble resources such as in the RACH-like contention-free method used for the configured CSI-RS. For such large overhead, contention-based RACH resources can be used.

Instead of using a traditional 4-step RACH procedure, akin to that used in initial access, a modified 2-step RACH procedure can be used such that the preamble resources for the contention based procedure are used to indicate the SS-block used for the new beam identification to the network, and a random access response is used by the network to signal the detection of the transmitted preamble and a timing synchronization alignment instruction to synchronize subsequent uplink transmissions from the UE. The proposed RACH procedure does not require transmission of a message to indicate the user ID, since the UE is known to the network, and does not subsequently require contention resolution.

In one embodiment, described herein is a method comprising in response to a determination of a first failure of a reference signal configured to manage a first beam, the first failure indicating that the reference signal was not received, determining a second failure associated with the first beam, wherein the reference signal and the first beam are to be received by the mobile device from a network device of the wireless network. In response to a condition associated with the reference signal being determined to have been satisfied, the method can comprise identifying a second beam that is not the first beam. The method can also facilitate a transmission of the second beam via a transmission channel for a recovery request related to a recovery associated with the first beam to mitigate the second failure.

According to another embodiment, a system can facilitate, in response to a first determination of a first failure associated with a reference signal configured to manage a first beam, determining a second failure associated with a first beam, wherein the reference signal and the first beam have been directed to the mobile device from a network device of a wireless network. In response to a condition associated with the reference signal being determined to have been satisfied, the system can identify a second beam that is not the first beam, wherein the condition is further associated with a second determination that the reference signal does not identify the second beam. In response to the second determination that the reference signal does not identify the second beam, the system can utilize a synchronization signal block associated with a synchronization signal to identify the second beam. Furthermore, the system can transmit the second beam via a random access channel for a recovery request related to a recovery of the first beam to rectify the second failure.

According to yet another embodiment, described herein is a machine-readable storage medium that can perform the operations comprising in response to a first determination of a first failure associated with a blocked reference signal of a wireless network, determining a second failure associated with a first beam associated with the blocked reference signal. In response to a condition associated with the blocked reference signal being determined to have been satisfied, the machine-readable storage medium can facilitate identifying a second beam, wherein the condition is further associated with a second determination that the blocked reference signal does not identify the second beam. In response to the second determination that the blocked reference signal does not identify the second beam, the machine-readable storage medium can facilitate utilizing a synchronization signal block associated with a synchronization signal to identify the second beam. Additionally, the machine-readable storage medium can facilitate transmitting data associated with the second beam via a random access channel for a recovery request related to a recovery of the first beam to rectify the second failure.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
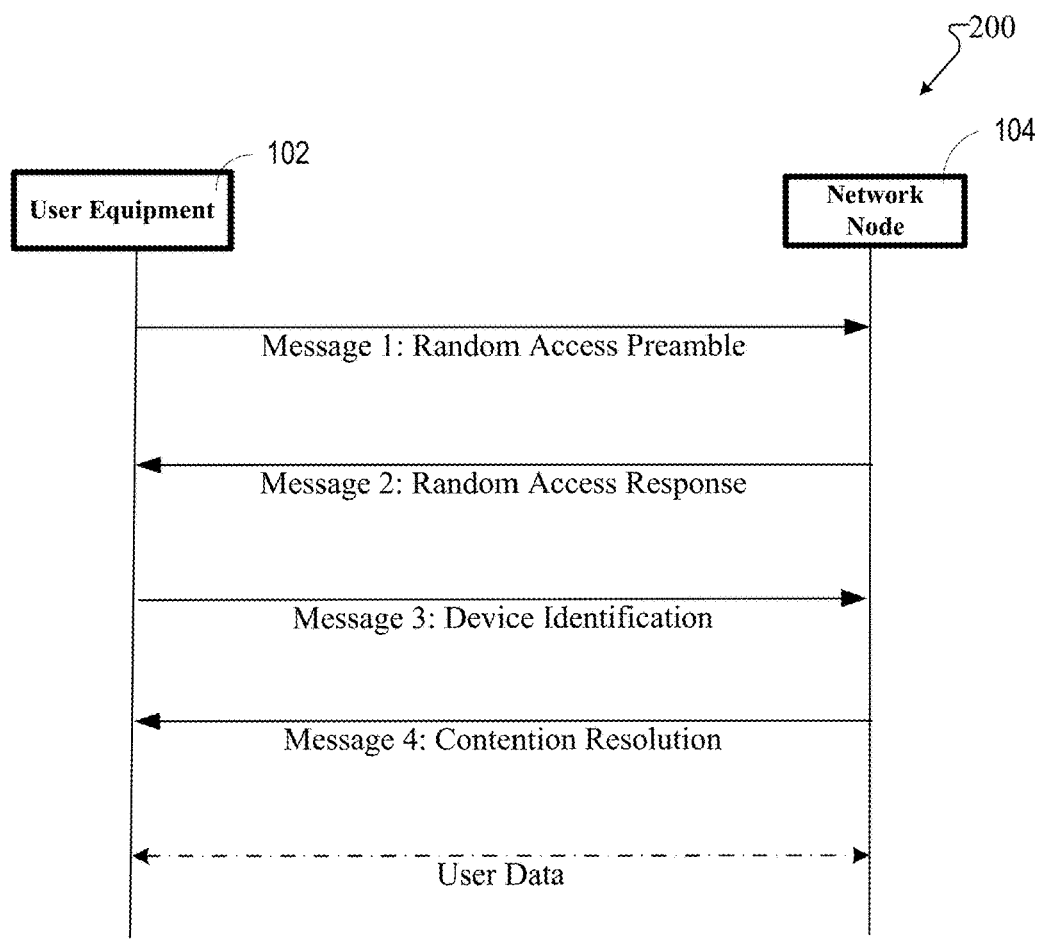
FIG. 2 illustrates an example schematic system block diagram of a random access message sequence chart according to one or more embodiments.

Referring now to FIG. 2, illustrated an example schematic system block diagram of a random access message sequence chart according to one or more embodiments. A standard message sequence chart 200 for a 4-step random access procedure in next generation cellular networks is depicted in FIG. 2. Random access allows the UE 102 to request a connection setup with the network node 104. Random access can be used for initial access (e.g., moving from radio resource control (RRC)-idle to RRC-connected), to re-establish a connection, after link failure, for handover.

The 4-step random access procedure illustrated comprises a UE 102 transmitting a random access preamble for the network to estimate the UE timing and establish uplink (UL) synchronization in Message 1. Message 2, from the network node 104, can comprise a random access response for transmitting a timing advance command to adjust the device transmit timing, and assign uplink resources for the device to use for Message. 3. Message 3, sent from the UE 102, can comprise an UL physical UL shared channel (PUSCH) to transmit the UE identity, among other information, to the network node 104. This is similar to normal scheduled data, and the content of Message 3 depends on the state of the device. Message 4 from the network node 104 can comprise contention resolution on a DL physical downlink shared channel (PDSCH) if there is a contention due to multiple users trying to access the network.

In addition to the baseline contention-based 4-step RACH procedure, a contention-free random access procedure can be defined, where the network can assign a dedicated preamble signature to the UE 102, so that UEs 102 do not have to contend for preamble resources. This simplifies the procedure to a 2-step procedure that only has a preamble transmission step, and a random access response step. The contention-free RACH procedure can reduce the latency in cases such as handover.

Additionally, a third random access procedure can possibly be defined where the 4-step procedure is replaced by a simplified 2-step procedure. This simplified RACH procedure is motivated by a reduction in the overhead and delay, when a small packet is transmitted. It can also be beneficial in an unlicensed scenario, or an LTE-assisted random access procedure.

For the 2-step (simplified) RACH procedure, transmission contents are combined into two steps. Message 1 is transmitted in step 1, and Message 2 is transmitted in step 2. Message 1 in the 2-step procedure can be thought of as combining Message 1 and Message 3 in the 4-step procedure, whereas the preamble can be sent followed by the message part that contains the device identity in addition to other mobile device messages. The Message 2 in step 2 of the 2-step RACH procedure can be thought of as combining Message 2 and Message 4, whereas a Message 2 carries timing advance, UL grant and contention resolution information.

NR supports a 4-step random access procedure as a baseline. Random access procedure is supported for both RRC-idle (idle) and RRC-connected (connected) UEs. At least for UE in idle mode, the UE can select the subset of RACH preamble indices based on DL measurement and association indicated by system information (SI).

Figure 3:
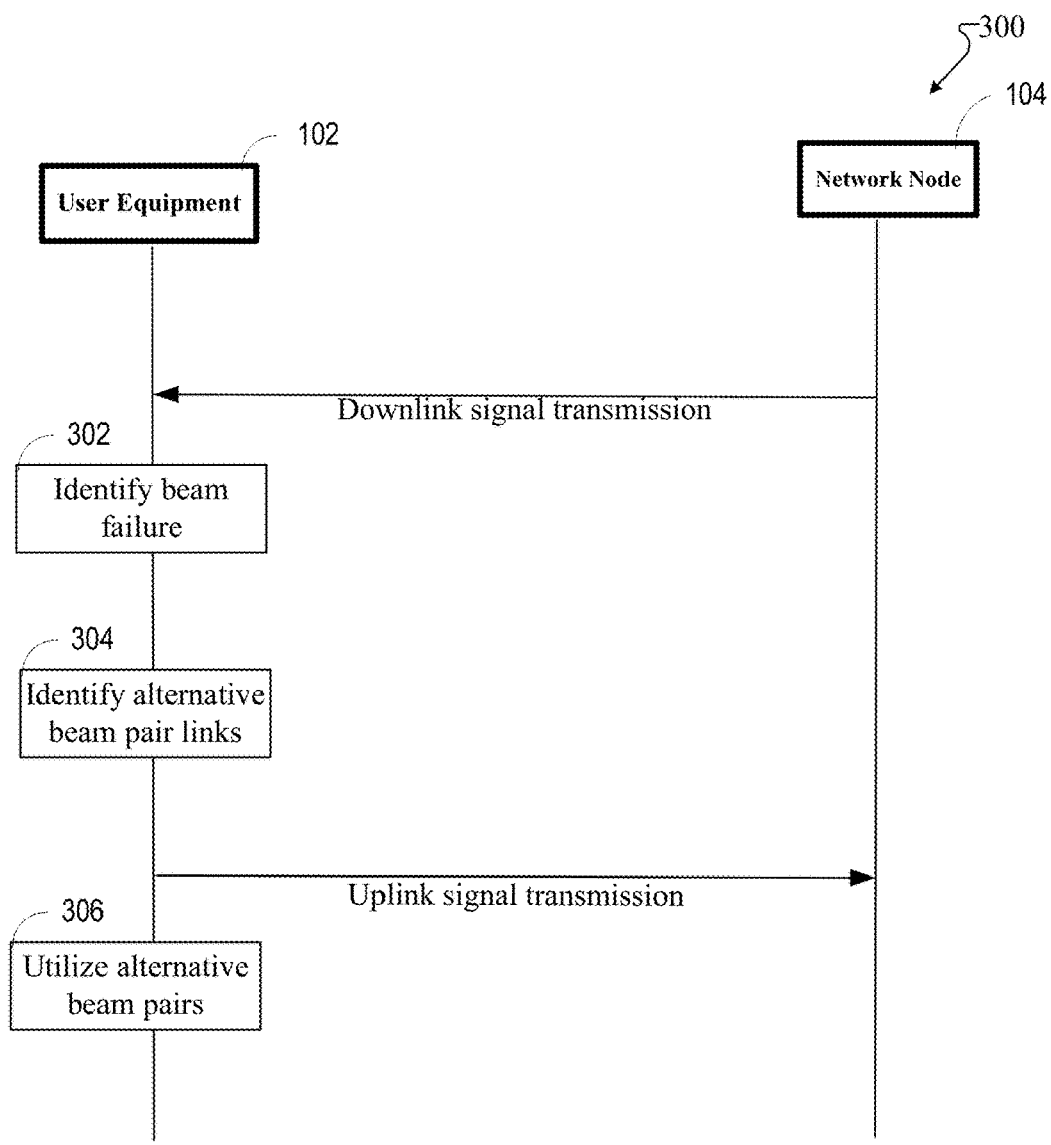
FIG. 3 illustrates an example schematic system block diagram of beam failure recovery according to one or more embodiments.

Referring now to FIG. 3, illustrated is an example schematic system block diagram of beam failure recovery chart 300 according to one or more embodiments. During a channel measurement campaign, one of the mmWave propagation problems is a blockage effect. As a result of smaller wave lengths, objects around a user, including the user, might temporarily block the mmWave propagation in a certain direction. The narrower beamforming of NR can increase the magnitude of this effect. Therefore, bam failure recovery can also comprise the following procedure as indicated in the beam failure recovery chart 300.

The network node 104 can send a downlink signal transmission to the UE 102. The UE 102 can then identify a beam failure 302 based on the configured RS resource using that beam. The UE 102 can also identify alternative beams pair links 304 (including Tx and Rx beams) as new beams to interact with. The UE 102 can then transmit uplink signaling (i.e., recovery request transmission) to the network node 104 to indicate the beam failure as well as the alternative beam pairs. Thereafter, the UE 102 can then switch to a physical channel downlink control information (PDCCH) receiver beam according by utilizing the alternative beam pairs 306 to monitor the PDCCH for confirmation from the network node 104 (e.g., gNB confirmation).

Figure 4:
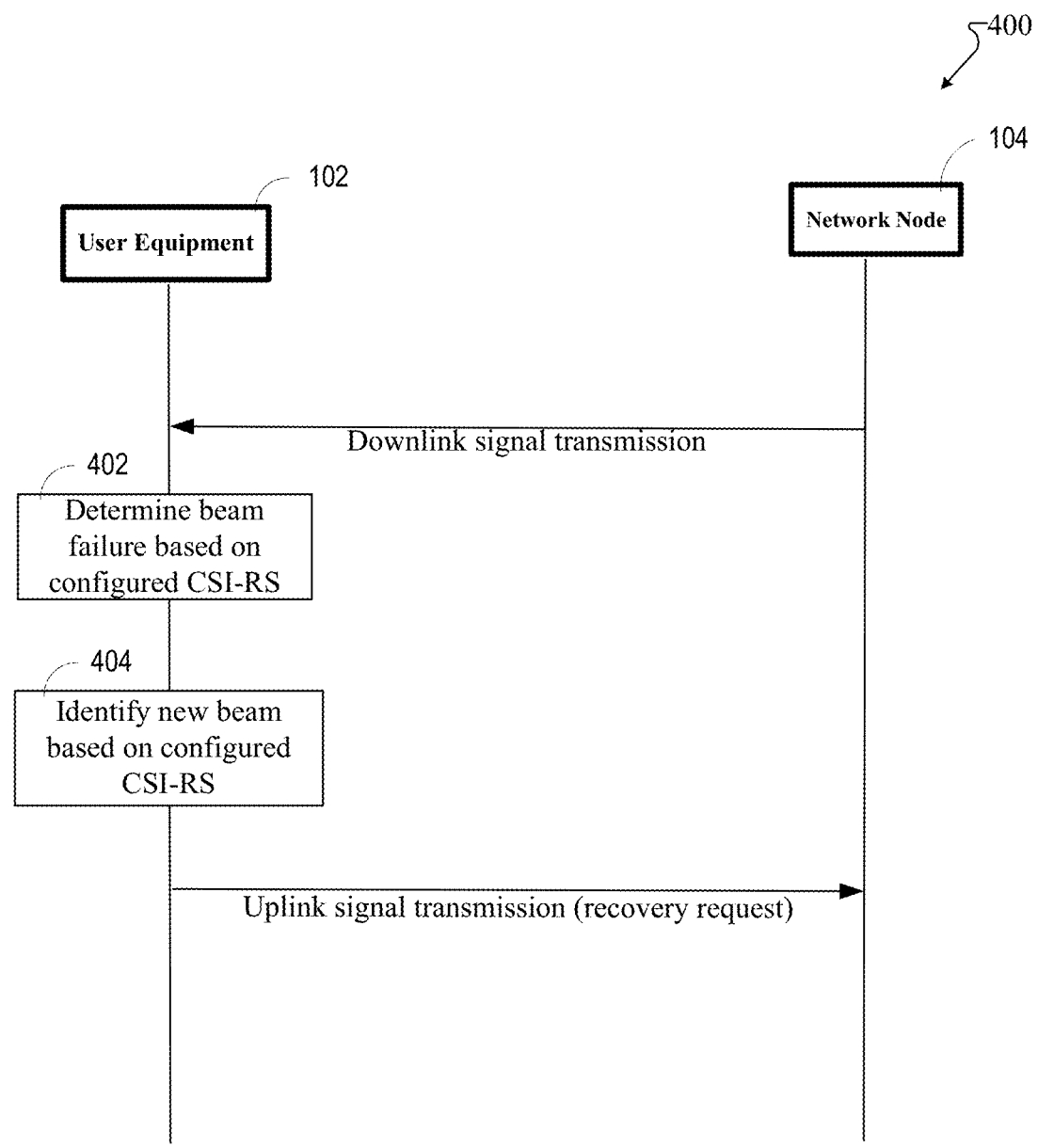
FIG. 4 illustrates an example schematic system block diagram of beam identification by configured channel state information-reference signal (CSI-RS) according to one or more embodiments.

Referring now to FIG. 4, illustrated is an example schematic system block diagram of beam identification by configured CSI-RS according to one or more embodiments. The 2-step procedure 400 can begin with a downlink signal transmission being sent from the network node 104 to the UE 102. Therefore, the first step can use configured CSI-RS resources to identify a new beam. For example, the UE 102 can determine beam failure based on a configured CSI-RS 402. At step 2, the UE 102 can identify a new beam based on the configured CSI-RS resources in step 1. Thus, the new beam information can be reported in the recovery request transmission of an uplink signal.

Figure 5:
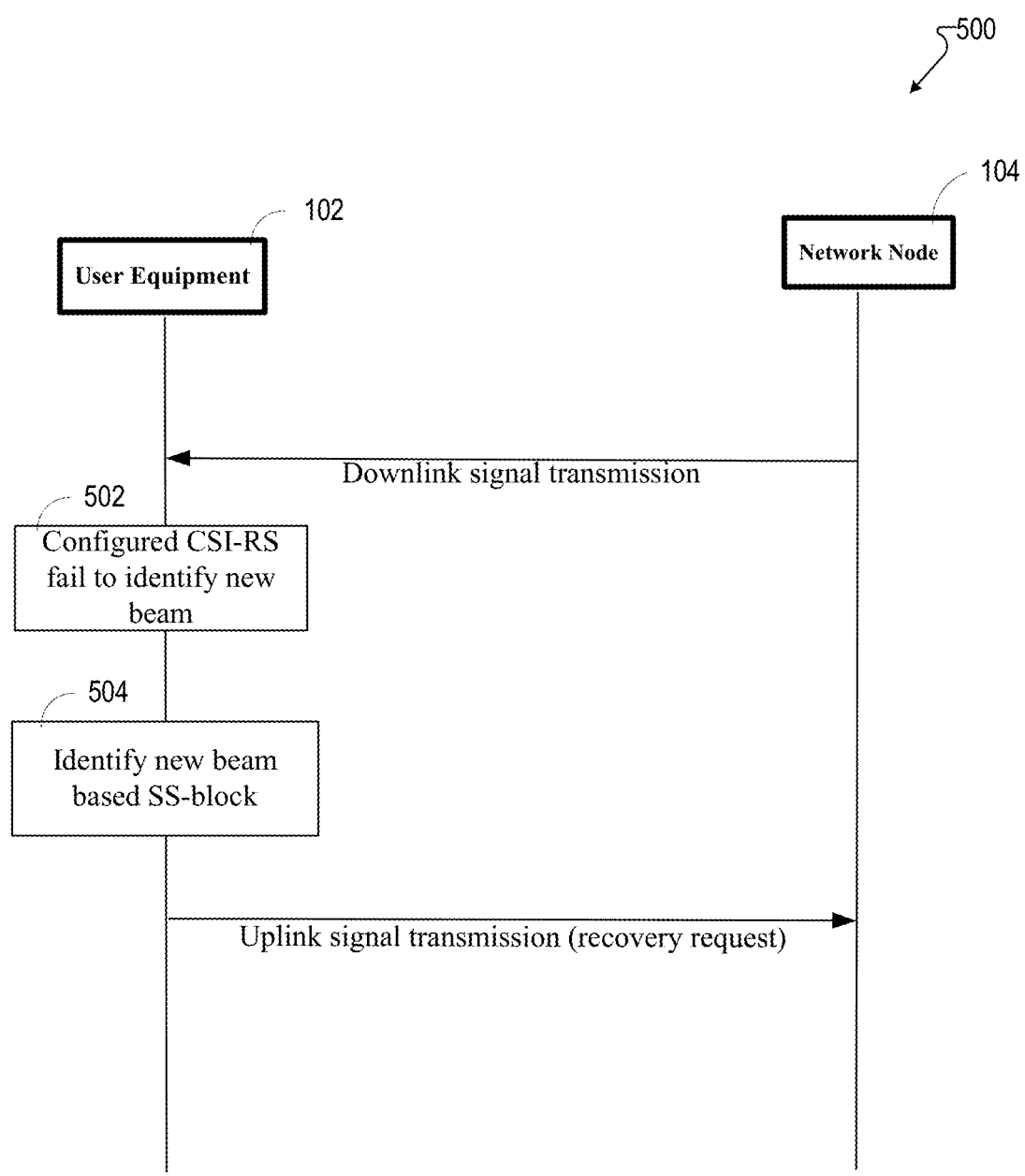
FIG. 5 illustrates an example schematic system block diagram of beam identification by an SS-block according to one or more embodiments.

Referring now to FIG. 5 illustrates an example schematic system block diagram of beam identification by an SS-block according to one or more embodiments. In another embodiment, the 2-step procedure 500 can begin with a downlink signal transmission being sent from the network node 104 to the UE 102. For this scenario, step 1 can comprise a configured CSI-RS failing to identify a new beam 502. However, the second step, can comprise identification of new beams based on SS-blocks 504. In NR initial access, synchronization signals NR-PSS, NR-SSS and/or NR-PBCH can be transmitted within an SS-block. One or multiple SS-blocks compose an SS burst. One or multiple SS bursts compose a SS burst set where the number of SS bursts within an SS burst set is finite. A given number of SS blocks per cell can be transmitted with a given periodicity, depending on the carrier frequency, to establish synchronization of the UE 102 with the network node 104. SS-blocks are not configured per UE 102, but rather transmitted periodically by the network node 104.

The second step comprises using other transmitted RS (e.g., others besides the configured CSI-RS) for new candidate beam identification, wherein the RS used in the second step can be based on SS-block. The SS-block based new candidate beam identification can then be signaled to the network via a recovery request transmission of an uplink signal.

Figure 6:
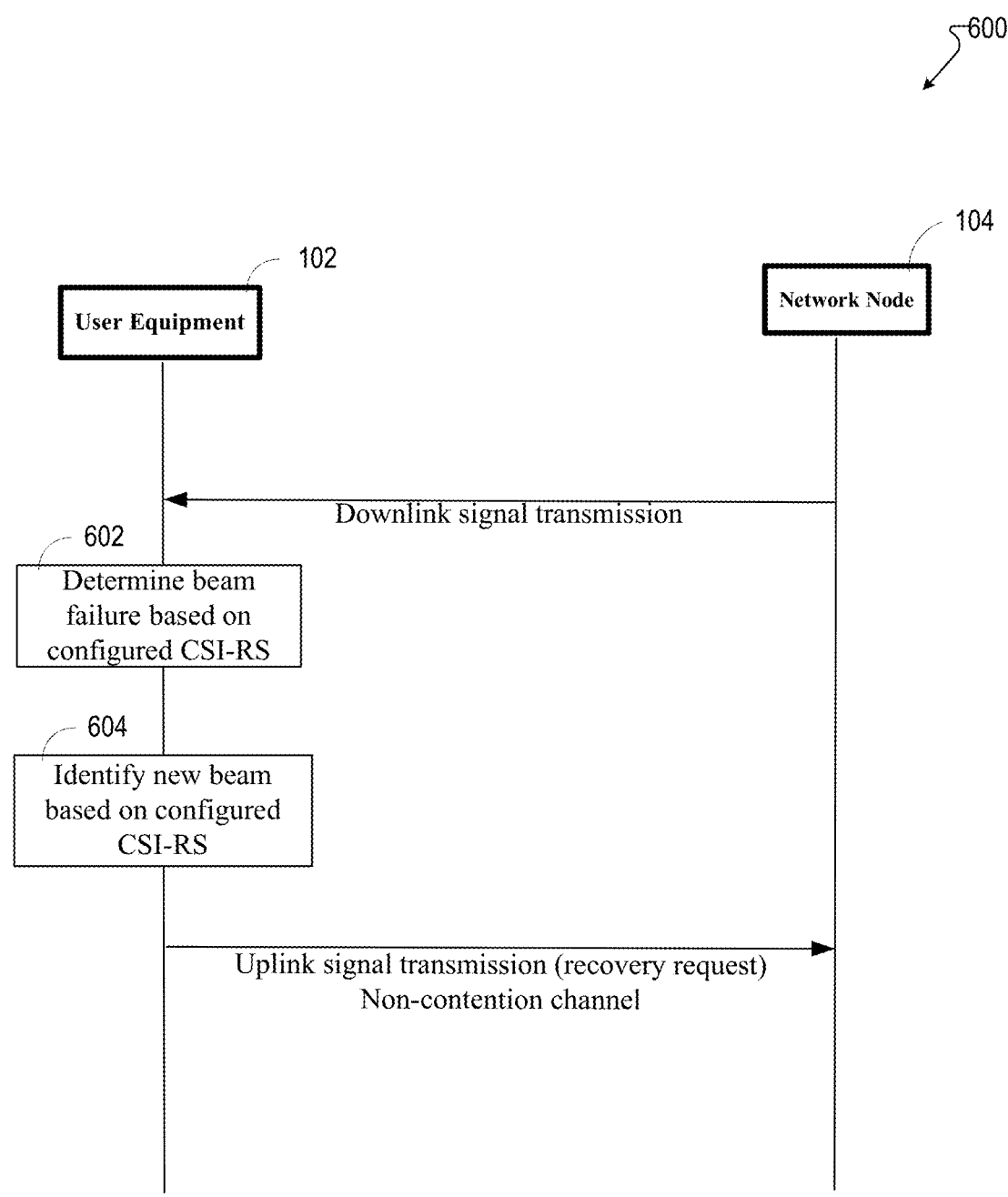
FIG. 6 illustrates an example schematic system block diagram of beam identification by configured CSI-RS and a non-contention channel according to one or more embodiments.

Referring now to FIG. 6, illustrated is an example schematic system block diagram of beam identification by configured CSI-RS and a non-contention channel according to one or more embodiments. This embodiment comprises a 2-step procedure 600 that can begin with a downlink signal transmission being sent from the network node 104 to the UE 102. Therefore, the first step can leverage configured CSI-RS resources to determine a beam failure. For example, the UE 102 can determine beam failure based on a configured CSI-RS 602. At step 2, the UE 102 can identify a new beam based on the configured CSI-RS resources in step 1. Thus, the new beam information can be reported in the recovery request transmission of an uplink signal. However, in this embodiment, a non-contention channel (e.g., assigning a preamble to the UE 102) associated with a PRACH can be used for beam recovery request transmission. Thus, the required overhead to report on the identified beam using configured CSI-RS is not significant enough to use contention-based RACH preamble resources.

Figure 7:
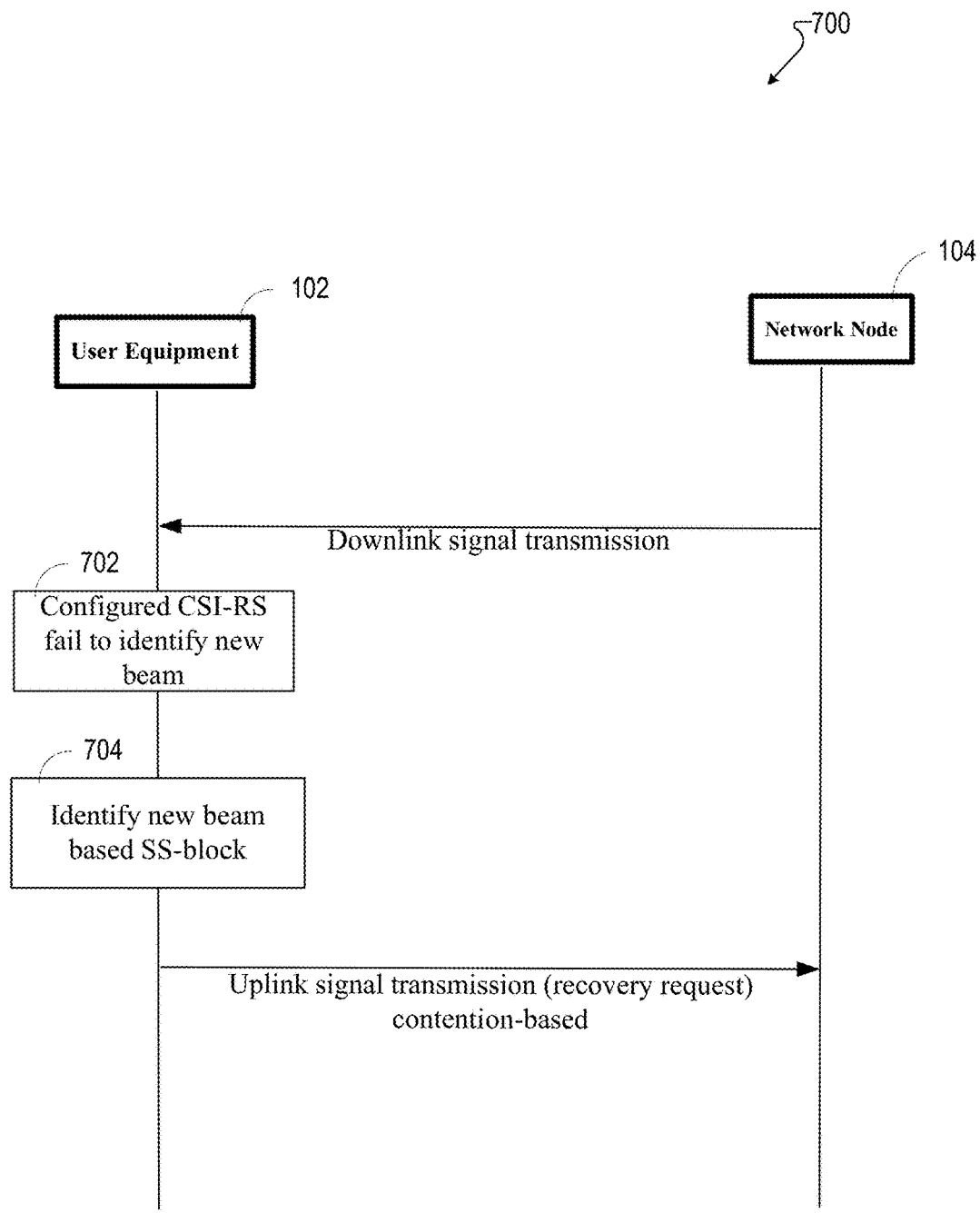
FIG. 7 illustrates an example schematic system block diagram of beam identification by an SS-block and a contention channel according to one or more embodiments.

Referring now to FIG. 7, illustrated is an example schematic system block diagram of beam identification by an SS-block and a contention channel according to one or more embodiments. In yet another embodiment comprising a 2-step procedure 700, a downlink signal transmission can be sent from the network node 104 to the UE 102. For the scenario, when a configured CSI-RS fails to identify a new beam 702, the new beam can be identified by the SS-blocks 704. In NR initial access, synchronization signals NR-PSS, NR-SSS and/or NR-PBCH can be transmitted within an SS-block. One or multiple SS-blocks compose an SS burst. One or multiple SS bursts compose a SS burst set where the number of SS bursts within an SS burst set is finite. A given number of SS blocks per cell can be transmitted with a given periodicity, depending on the carrier frequency, to establish synchronization of the UE 102 with the network node 104. SS-blocks are not configured per UE 102, but rather transmitted periodically by the network node 104.

The second step comprises using other transmitted RS (e.g., others besides the configured CSI-RS) for new candidate beam identification, wherein the RS used in the second step can be based on SS-block. The SS-block based new candidate beam identification can then be signaled to the network via a recovery request transmission of an uplink signal.

For the two-step new beam identification procedure, when SS-block is used to identify new beams, the number of SS-blocks transmitted for a given cell ID might lead to a large overhead that cannot be handled by reserving contention-free preamble resources such as similar to the RACH contention-free method used for configured CSI-RS. Thus, for such large overhead, contention-based RACH resources can be used.

Figure 8:
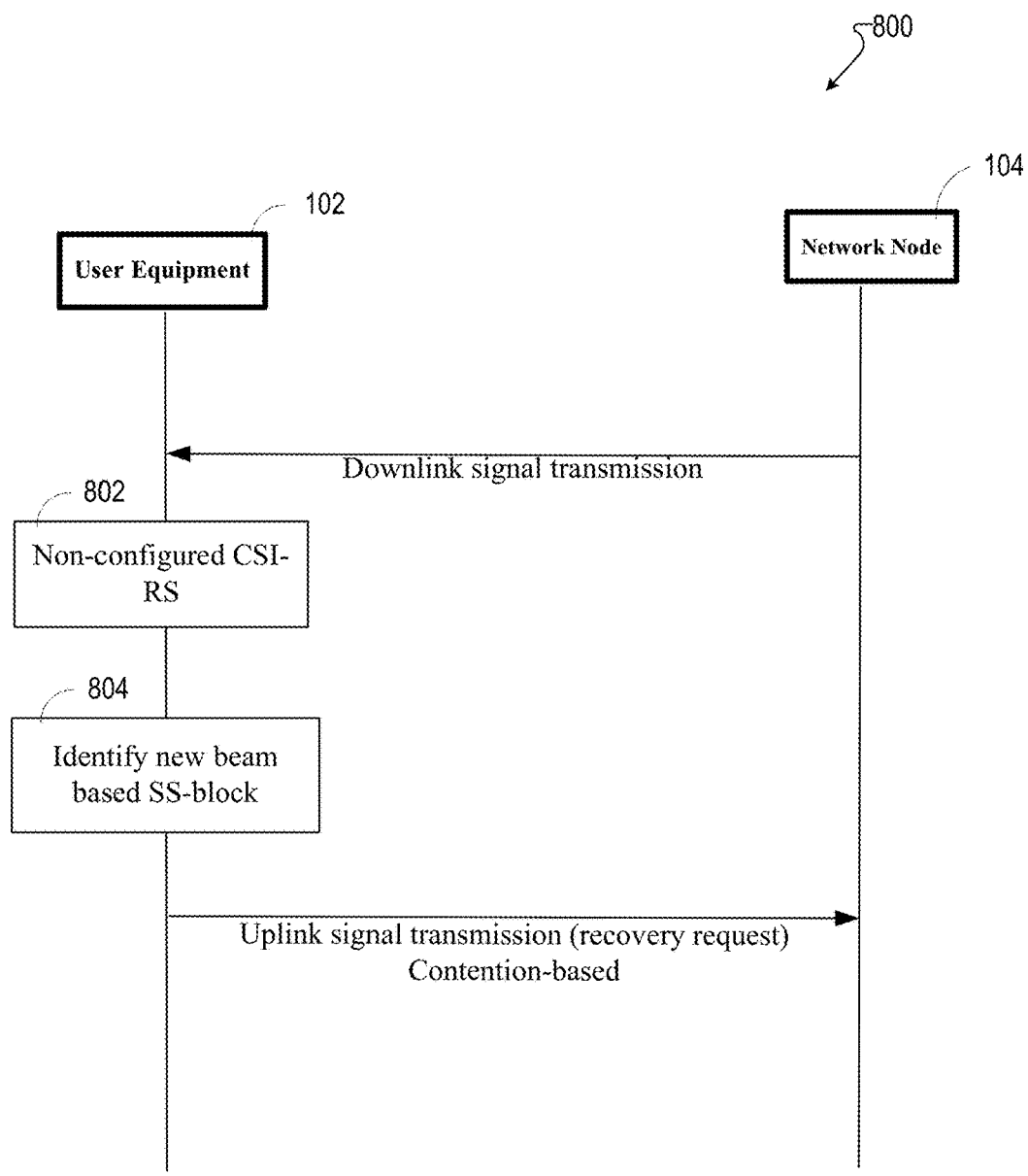
FIG. 8 illustrates an example schematic system block diagram of beam identification by an SS-block and contention channel based on a non-configured CSI-RS according to one or more embodiments.

Referring now to FIG. 8, illustrated is an example schematic system block diagram of beam identification by an SS-block and contention channel based on a non-configured CSI-RS according to one or more embodiments. This embodiment comprises a 2-step procedure 800 that can begin with a downlink signal transmission being sent from the network node 104 to the UE 102. In this scenario, when the CSI-RS is not configured in the network 802, the SS-block can identify the new beam 804 and transmit in the recovery request transmission via an uplink signal transmission.

In NR initial access, synchronization signals NR-PSS, NR-SSS and/or NR-PBCH can be transmitted within an SS-block. One or multiple SS-blocks compose an SS burst. One or multiple SS bursts compose a SS burst set where the number of SS bursts within an SS burst set is finite. A given number of SS blocks per cell can be transmitted with a given periodicity, depending on the carrier frequency, to establish synchronization of the UE 102 with the network node 104. SS-blocks are not configured per UE 102, but rather transmitted periodically by the network node 104.

The second step comprises using other transmitted RS (e.g., others besides the configured CSI-RS) for new candidate beam identification, wherein the RS used in the second step can be based on SS-block. The SS-block based new candidate beam identification can then be signaled to the network via a recovery request transmission of an uplink signal.

For the two-step new beam identification procedure, when SS-block is used to identify new beams, the number of SS-blocks transmitted for a given cell ID can lead to a large overhead that may not be handled by reserving contention-free preamble resources such as those similar to the RACH contention-free method used for the configured CSI-RS. Thus, for such large overhead, contention-based RACH resources can be used.

Figure 9:
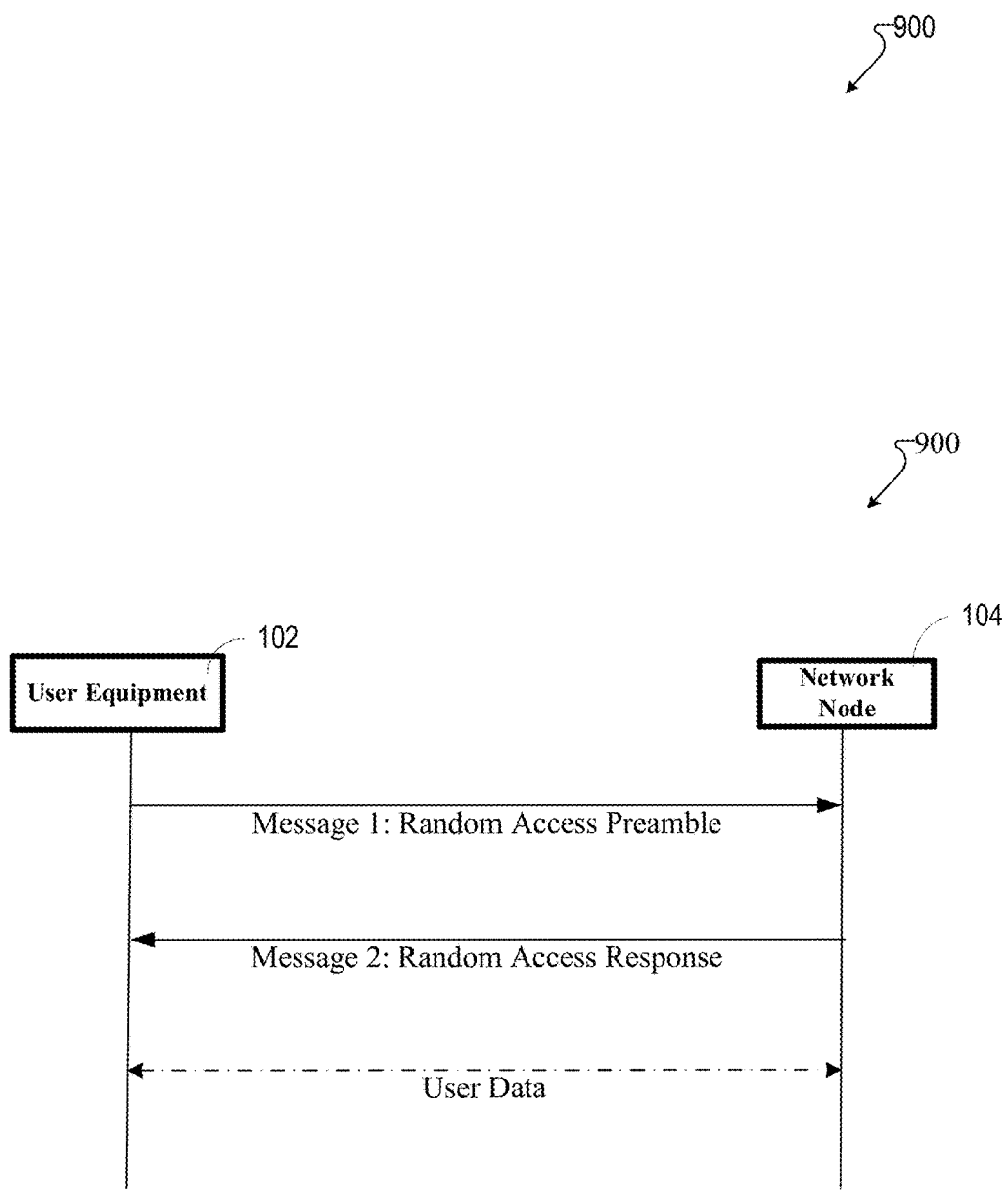
FIG. 9 illustrates an example schematic system block diagram of modified contention based random access channel (RACH) procedure according to one or more embodiments.

Referring now to FIG. 9, illustrates an example schematic system block diagram of modified contention based RACH procedure according to one or more embodiments. Instead of using a traditional 4-step RACH procedure, akin to that used in initial access, a modified 2-step RACH procedure 900 is represented. The modified RACH procedure can comprise preamble resources (e.g., Message 1: random access preamble) for the contention-based procedure, which can be used to indicate the SS-block used for new beam identification to the network node 104, and a random access response (e.g., Message 2) can be used by the network node 104 to signal the detection of the transmitted preamble and a timing alignment instruction to synchronize subsequent uplink transmissions from the UE 102. The proposed RACH procedure does not, however, require transmission of a Message 3 to indicate the UE ID, since the UE 102 is known to the network node 104, and does not subsequently require contention resolution. The proposed modified contention based RACH procedure for recovery request transmission can further be applied to the simplified 2-RACH procedure, whereas the signaling in the simplified 2-step RACH procedure can be further reduced in the Message 1 and Message 2 to only account for the signaling required to deliver and identify the preamble resources by the UE 102 and the network node 104.

Figure 10:
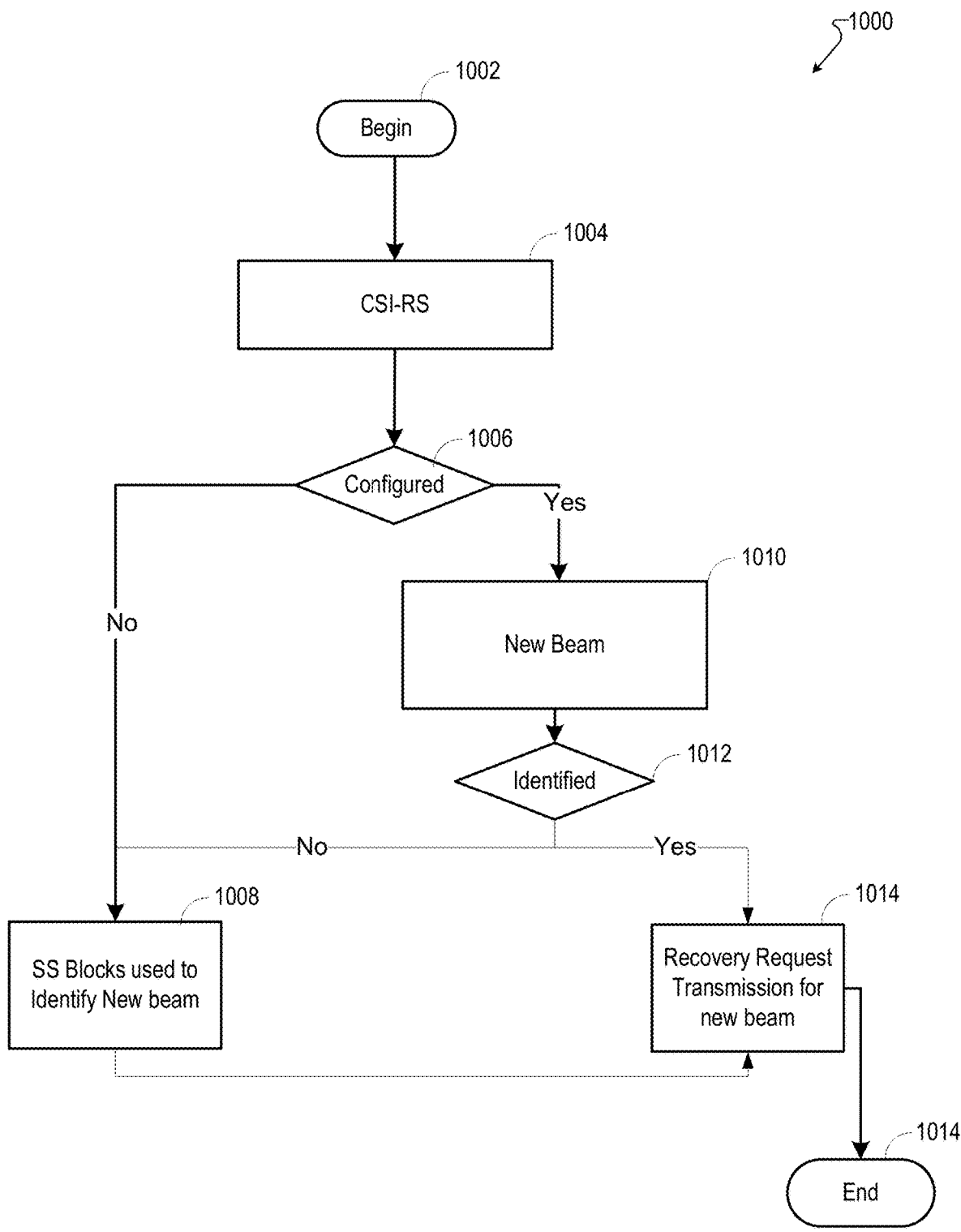
FIG. 10 illustrates an example flow chart for beam selection according to one or more embodiments.

Referring now to FIG. 10, illustrated is an example flow chart for beam selection according to one or more embodiments. The beam selection flow chart 1000 can begin at step 1002. It should be understood that to begin this process, a downlink signal transmission can be sent from the network node 104 to the UE 102. Block 1004 comprises a CSI-RS. If the CSI-RS is configured, then the decision tree can select yes at step 1006 and proceed to block 1010 for the new beam. Alternatively, if the CSI-RS is not configured, then the decision tree can select no at step 1006 and proceed to identify the new beam via SS blocks of block 1008 at the UE 102. Thereafter, the UE 102 can send a recovery request transmission for the new beam, at block 1014, to the network node 104. Sending the recovery request transmission based on the SS-block identification can also end the process at the end block 1014.

If the new beam is identified at step 1012, then the UE 102 can send a recovery request transmission for the new beam, at block 1014, to the network node 104. Sending the recovery request transmission can end the process at the end block 1014. Alternatively, if the new beam is not identified at step 1012, then SS-blocks can be used to identify the new beam by the UE 102 at block 1008. Thereafter, the UE 102 can send a recovery request transmission for the new beam, at block 1014, to the network node 104. Sending the recovery request transmission based on the SS-block identification can also end the process at the end block 1014.

Figure 11:
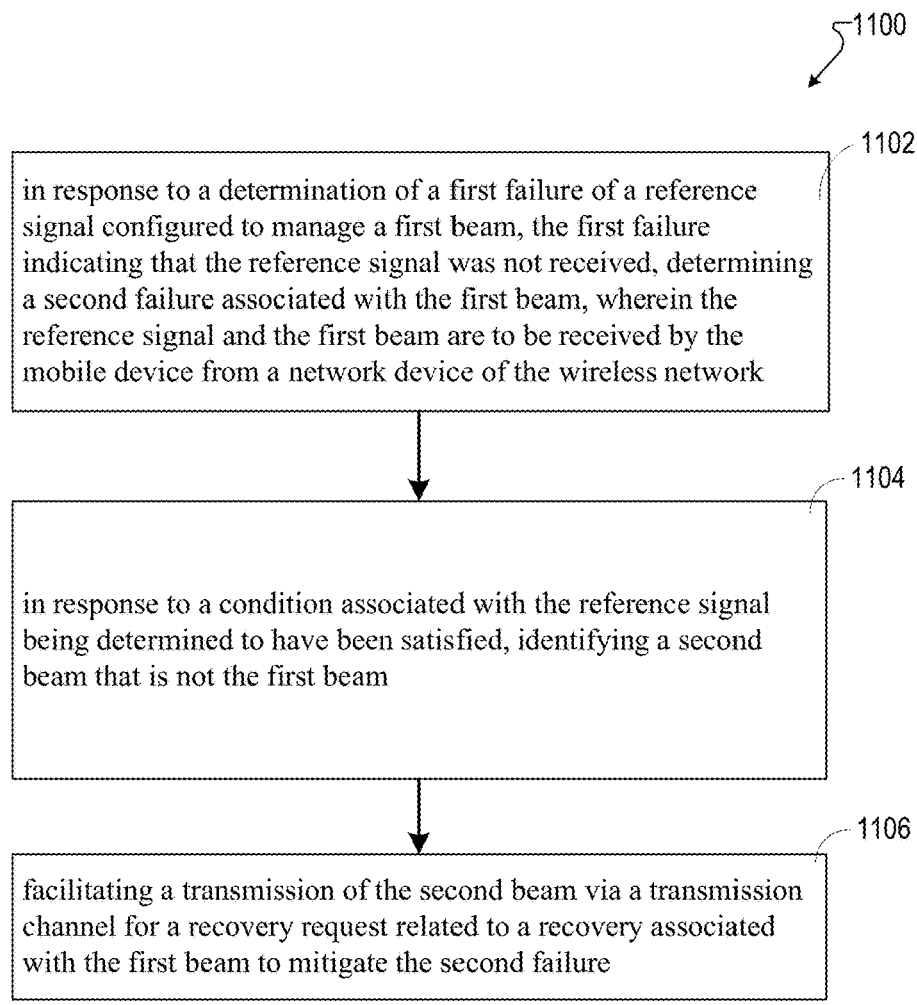
FIG. 11 illustrates an example flow diagram for a method for beam selection for a 5G network according to one or more embodiments.

Referring now to FIG. 11, illustrated is an example flow diagram for a method for beam selection 1100 for a 5G network according to one or more embodiments. In response to a determination of a first failure of a reference signal configured to manage a first beam, the first failure indicating that the reference signal was not received, a method can determine a second failure (e.g., via a UE 102) associated with the first beam, wherein the reference signal and the first beam are to be received by the mobile device from a network device of the wireless network at element 1102. In response to a condition associated with the reference signal being determined to have been satisfied, the method can comprise identifying (e.g., via a UE 102) a second beam that is not the first beam at element 1104. The method can also facilitate a transmission of the second beam via a transmission channel for a recovery request related to a recovery associated with the first beam to mitigate the second failure at element 1106.

Figure 12:
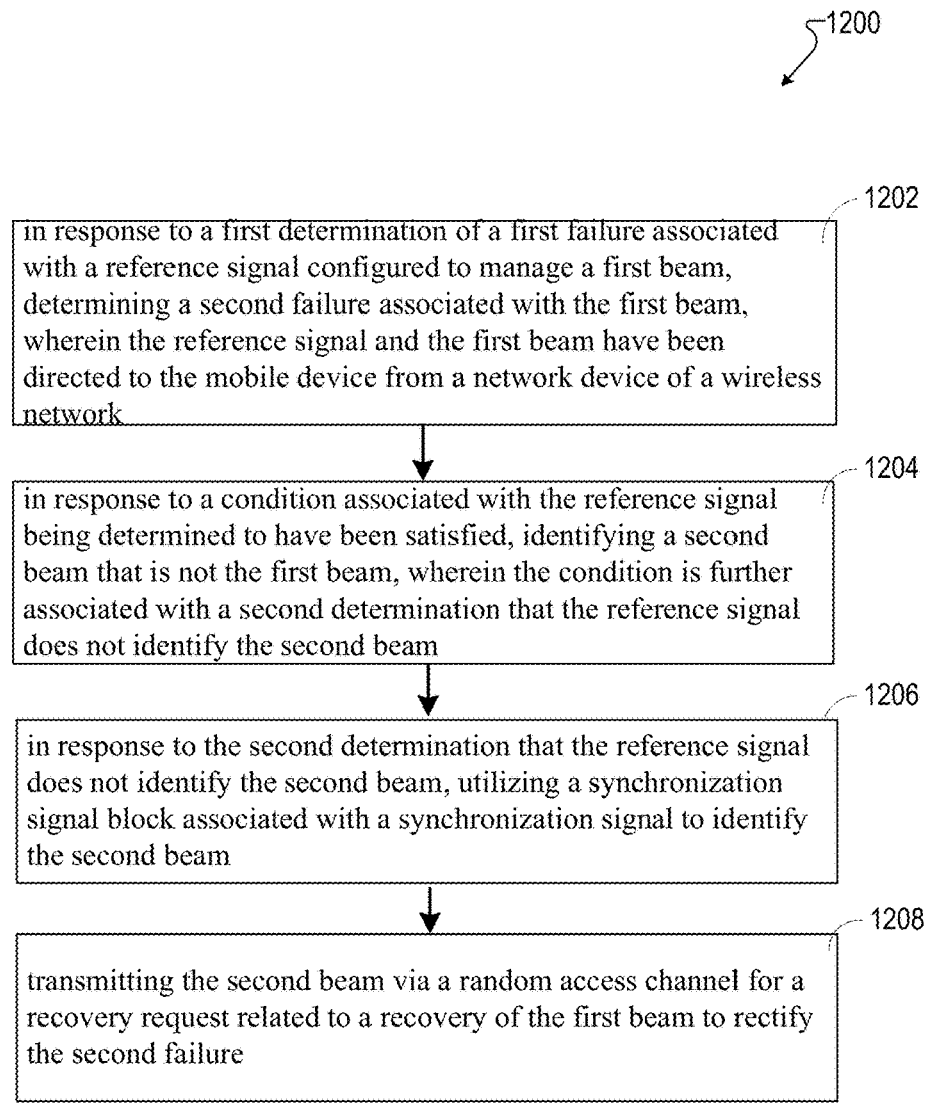
FIG. 12 illustrates an example flow diagram for a system for beam selection for a 5G network according to one or more embodiments.

Referring now to FIG. 12, illustrated is an example flow diagram for a system for beam selection 1200 for a 5G network according to one or more embodiments. In response to a determination of a first failure associated with a reference signal configured to manage a first beam, the system can determine a second failure (e.g., via a UE 102) associated with the first beam, wherein the reference signal and the first beam have been directed to the mobile device from a network device of a wireless network at element 1202. In response to a condition associated with the reference signal being determined to have been satisfied, the system can identify (e.g., via a UE 102) a second beam that is not the first beam, wherein the condition is further associated with a second determination that the reference signal does not identify the second beam at element 1204. Additionally, in response to the second determination that the reference signal does not identify the second beam, the system can utilize a synchronization signal block (e.g., via a UE 102) associated with a synchronization signal to identify the second beam at element 1206. Furthermore, the system can transmit (e.g., via a UE 102) the second beam via a random access channel for a recovery request related to a recovery of the first beam to rectify the second failure at element 1208.

Figure 13:
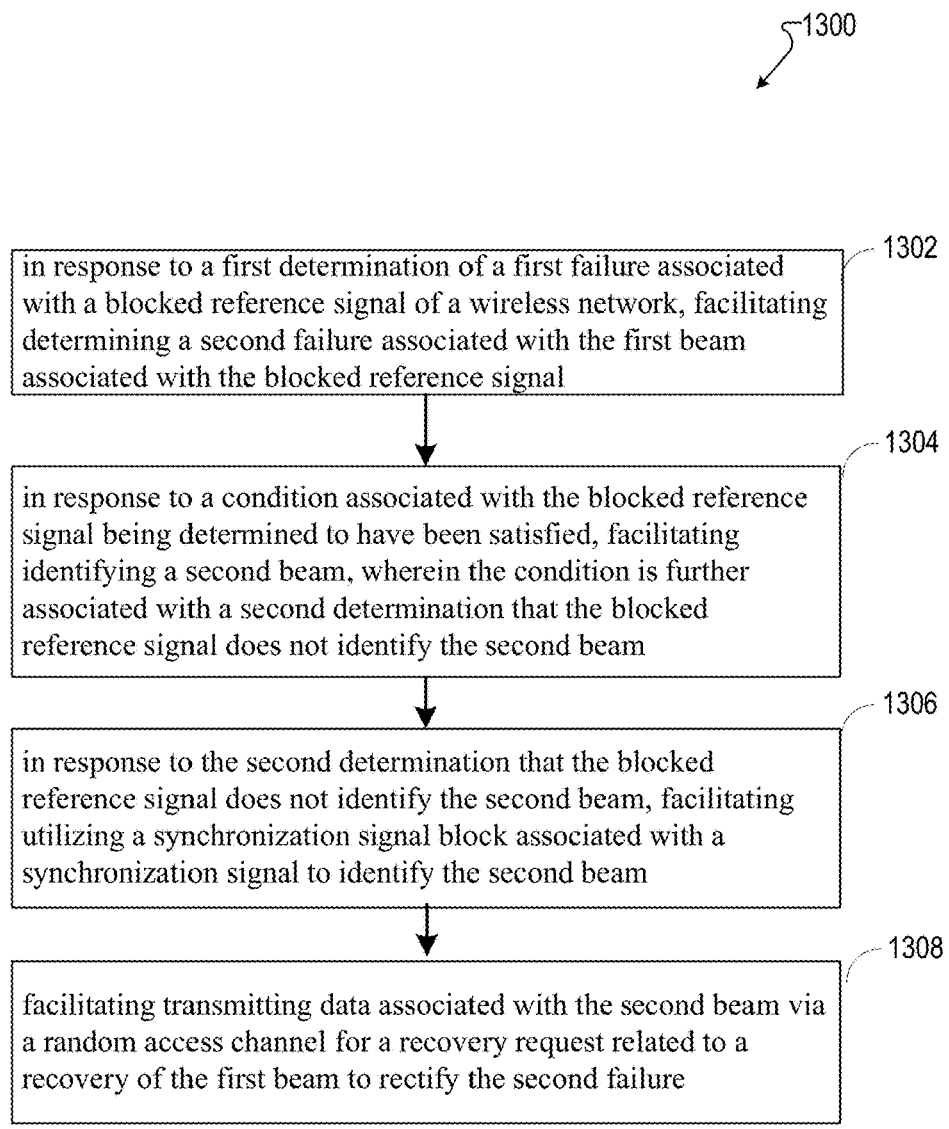
FIG. 13 illustrates an example flow diagram for machine-readable medium for beam selection for a 5G network according to one or more embodiments.

Referring now to FIG. 13, illustrated is an example flow diagram for machine-readable medium for beam selection 1300 for a 5G network according to one or more embodiments. In response to a first determination of a first failure associated with a blocked reference signal of a wireless network, the machine-readable storage medium can facilitate determining a second failure associated (e.g., via a UE 102) with a first beam associated with the blocked reference signal at element 1302. At element 1304, in response to a condition associated with the blocked reference signal being determined to have been satisfied, the machine-readable storage medium can facilitate identifying (e.g., via a UE 102) a second beam, wherein the condition is further associated with a second determination that the blocked reference signal does not identify the second beam. In response to the second determination that the blocked reference signal does not identify the second beam, the machine-readable storage medium can facilitate utilizing (e.g., via a UE 102) a synchronization signal block associated with a synchronization signal to identify the second beam at element 1306. Additionally, at element 1308, the machine-readable storage medium can facilitate transmitting data (e.g., via a UE 102) associated with the second beam via a random access channel for a recovery request related to a recovery of the first beam to rectify the second failure.

Figure 14:
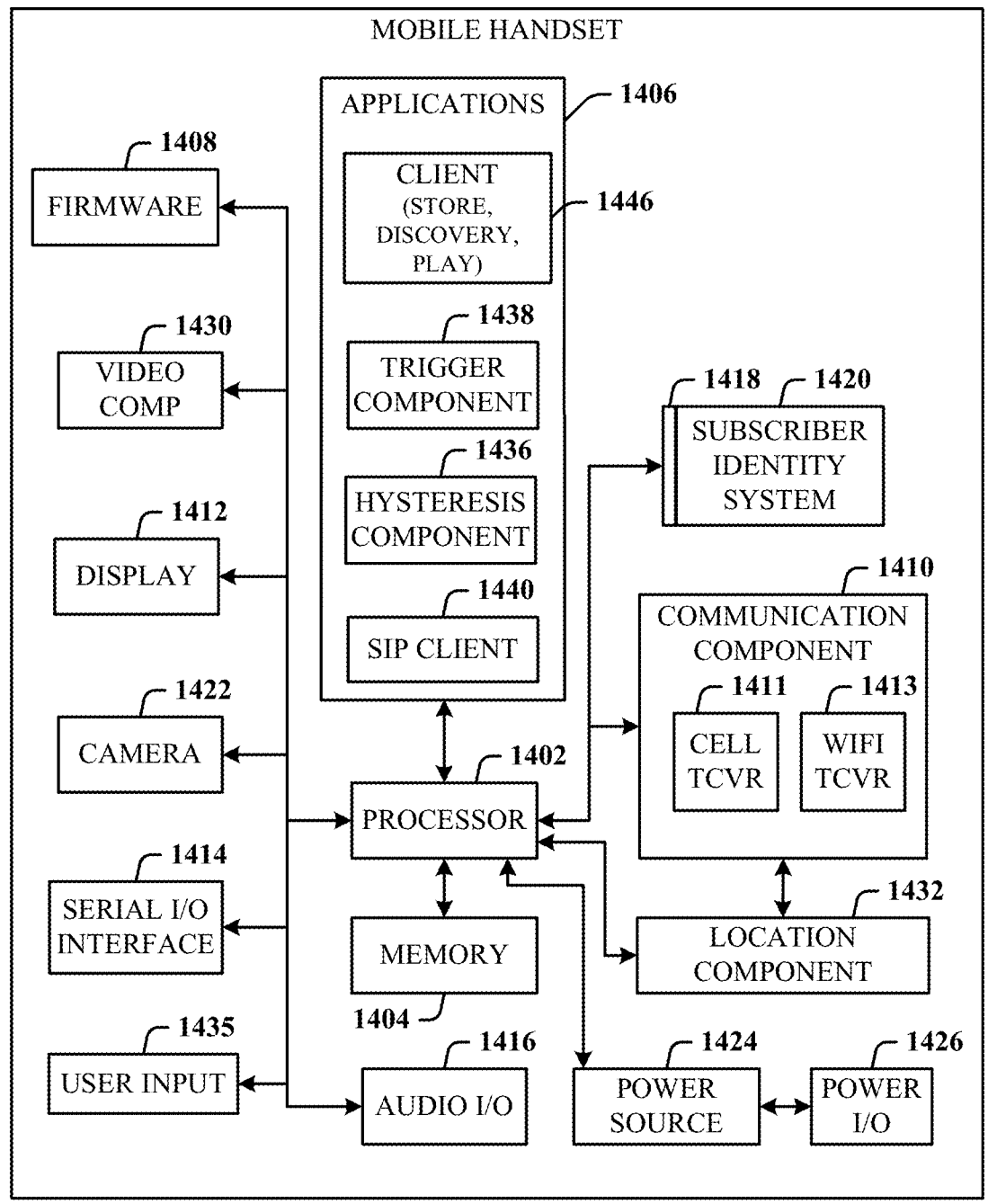
FIG. 14 illustrates an example block diagram of user equipment that can be a mobile handset in accordance with one or more embodiments.

Referring now to FIG. 14, illustrated is a schematic block diagram of a user equipment (e.g., user equipment 102) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a global GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
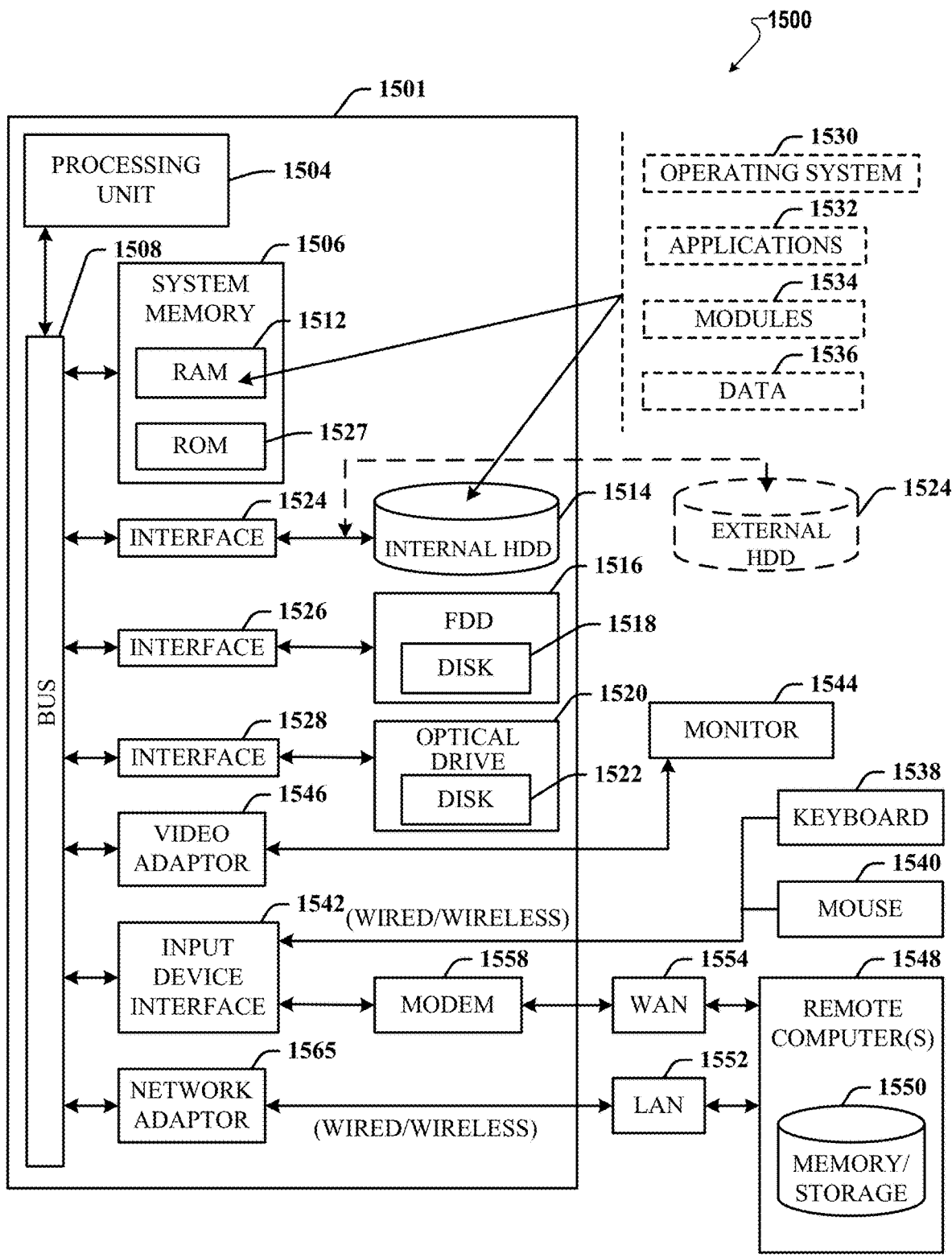
FIG. 15 illustrates an example block diagram of a computer that can be operable to execute processes and methods in accordance with various aspects and embodiments of the subject disclosure.

Referring now to FIG. 15, there is illustrated a block diagram of a computer 1500 operable to execute the functions and operations performed in the described example embodiments. For example, a network node (e.g., network node 104) may contain components as described in FIG. 15. The computer 1500 can provide networking and communication capabilities between a wired or wireless communication network and a server and/or communication device. In order to provide additional context for various aspects thereof, FIG. 15 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 15, implementing various aspects described herein with regards to devices can include a computer 1500, the computer 1500 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1527 and random access memory (RAM) 1512. A basic input/output system (BIOS) is stored in a non-volatile memory 1527 such as ROM, EPROM, EEPROM, which BIOS contains the basic routines that help to transfer information between elements within the computer 1500, such as during start-up. The RAM 1512 can also include a high-speed RAM such as static RAM for caching data.

The computer 1500 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1500 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1500, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1500 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 2394 serial port, a game port, a USB port, an IR interface, etc.

A monitor 1544 or other type of display device is also connected to the system bus 1508 through an interface, such as a video adapter 1546. In addition to the monitor 1544, a computer 1500 typically includes other peripheral output devices (not shown), such as speakers, printers, etc.

The computer 1500 can operate in a networked environment using logical connections by wired and/or wireless communications to one or more remote computers, such as a remote computer(s) 1548. The remote computer(s) 1548 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1500 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1500 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the input device interface 1542. In a networked environment, program modules depicted relative to the computer, or portions thereof, can be stored in the remote memory/storage device 1550. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Existing solutions for beam recovery request transmission is to use non-contention based RACH-like resources to inform the network of the identified new beam and the occurrence of beam failure. These resources might not be sufficient when another RS, other than configured CSI-RS is used for new beam identification, such as SS-block. Instead of using the traditional 4-step RACH procedure for beam recovery request transmission, a modified 2-step contention-based RACH procedure can save on overhead and latency associated with the traditional 4-step procedure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to a first determination of a first failure of a reference signal configured to manage a first beam, the first failure indicating that the reference signal was not received, determining, by a mobile device that is part of a wireless network and that comprises a processor, a second failure associated with the first beam, wherein the reference signal and the first beam are to be received by the mobile device from a network device of the wireless network;
in response to a condition associated with the reference signal being determined to have been satisfied, identifying, by the mobile device, a second beam that is not the first beam, wherein the condition is further associated with a second determination that the reference signal does not identify the second beam;
facilitating, by the mobile device, a transmission of the second beam via a transmission channel for a recovery request related to a recovery associated with the first beam to mitigate the second failure; and
in response to receiving confirmation data representative of a confirmation of the network device having received the second beam, sending, by the mobile device, mobile data to the network device after the second beam has been identified.

2. The method of claim 1, further comprising:
in response to the determining, utilizing, by the mobile device, the reference signal to identify the second beam.

3. The method of claim 2, wherein the utilizing comprises identifying a beam pair, and wherein the second beam is a transmission beam for transmitting network data via the network device.

4. The method of claim 1, further comprising:
transmitting the second beam via a physical random access channel for a recovery request associated with a recovery of the first beam to rectify the second failure.

5. The method of claim 1, further comprising:
in response to the second determination that the reference signal does not identify the second beam, utilizing, by the mobile device, a synchronization signal block associated with a synchronization signal to identify the second beam.

6. The method of claim 5, wherein the synchronization signal is a primary synchronization signal of synchronization signals capable of facilitating a timing synchronization between network devices of the wireless network.

7. The method of claim 6, wherein the primary synchronization signal is transmitted within the synchronization signal block to synchronize the mobile device with the network device.

8. The method of claim 5, wherein the synchronization signal is a secondary synchronization signal of synchronization signals capable of facilitating a timing synchronization between network devices of the wireless network.

9. The method of claim 5, wherein the synchronization signal comprises channel data associated with a primary broadcast channel capable of facilitating a timing synchronization between network devices of the wireless network.

10. A mobile device, comprising:
a processor; and
a memory that stores executable instructions that, when executed by the processor, facilitate performance of operations, comprising:
in response to a first determination of a first failure associated with a reference signal configured to manage a first beam, determining a second failure associated with the first beam, wherein the reference signal and the first beam have been directed to the mobile device from a network device of a wireless network;
in response to a condition associated with the reference signal being determined to have been satisfied, identifying a second beam that is not the first beam, wherein the condition is further associated with a second determination that the reference signal does not identify the second beam;
in response to the second determination that the reference signal does not identify the second beam, utilizing a synchronization signal block associated with a synchronization signal to identify the second beam;
transmitting the second beam via a random access channel for a recovery request related to a recovery of the first beam to rectify the second failure;
receiving confirmation data associated with a confirmation of the network device having received the second beam; and
in response to the receiving the confirmation data, sending mobile data to the network device after the second beam has been identified.

11. The mobile device of claim 10, wherein the random access channel is a physical random access channel associated with a non-contention based channel associated with a preamble identifier of the mobile device.

12. The mobile device of claim 10, wherein, in response to the utilizing the synchronization signal block, the random access channel is associated with a contention-based channel that comprises preamble data associated with the mobile device.

13. The mobile device of claim 12, wherein the operations further comprise:
based on the contention-based channel, sending identifier data representative of the preamble data associated with a reference from the mobile device to the network device to indicate use of the synchronization signal block.

14. The mobile device of claim 13, wherein the operations further comprise:
in response to the sending the identifier data, sending response data associated with a random access response from the network device to the mobile device to indicate reception of the identifier data.

15. The mobile device of claim 13, wherein the operations further comprise:
in response to the sending the identifier data, sending timing data associated with a timing alignment instruction from the network device to the mobile device to synchronize an uplink transmission from the mobile device.

16. A non-transitory machine-readable storage medium, comprising executable instructions that, when executed by a processor, facilitate performance of operations, comprising:
in response to a first determination of a first failure associated with a blocked reference signal of a wireless network, facilitating determining a second failure associated with a first beam associated with the blocked reference signal;
in response to a condition associated with the blocked reference signal being determined to have been satisfied, facilitating identifying a second beam, wherein the condition is further associated with a second determination that the blocked reference signal does not identify the second beam;
in response to the second determination that the blocked reference signal does not identify the second beam, facilitating utilizing a synchronization signal block associated with a synchronization signal to identify the second beam;
facilitating transmitting data associated with the second beam via a random access channel for a recovery request related to a recovery of the first beam to rectify the second failure; and
in response to facilitating sending of confirmation data associated with a confirmation that a network device has received the data associated with the second beam, facilitating sending mobile data from a first mobile device to the network device after the second beam has been identified.

17. The non-transitory machine-readable storage medium of claim 16, wherein the random access channel comprises a non-contention channel associated with preamble data representative of an identification of a mobile device.

18. The non-transitory machine-readable storage medium of claim 16, wherein the random access channel comprises a contention channel that is not associated with preamble data representative of an identification of a mobile device.

19. The non-transitory machine-readable storage medium of claim 17, wherein the random access channel is a physical random access channel.

20. The non-transitory machine-readable storage medium of claim 18, wherein, in response to the facilitating of the utilizing of the synchronization signal block, associating the random access channel with the contention channel.

* * * * *